United States Patent
Faust et al.

(10) Patent No.: US 6,924,336 B2
(45) Date of Patent: Aug. 2, 2005

(54) POLYMER DISPERSION COMPRISING PARTICLES OF POLYURETHANE AND A COPOLYMER OR TERPOLYMER PRODUCED BY EMULSION POLYMERIZATION OF OLEFINICALLY UNSATURATED MONOMERS

(75) Inventors: Hans Uwe Faust, Aachen Brand (DE); Alistair John McLennan, Beek (NL); Kevin Schofield, Warrington (GB)

(73) Assignee: Celanese International Corporation, Dallas, TX (US)

( * ) Notice: Subject to any disclaimer, the term of this patent is extended or adjusted under 35 U.S.C. 154(b) by 8 days.

(21) Appl. No.: 10/069,469

(22) PCT Filed: May 31, 2001

(86) PCT No.: PCT/EP01/06190

§ 371 (c)(1),
(2), (4) Date: Aug. 12, 2002

(87) PCT Pub. No.: WO02/00792

PCT Pub. Date: Jun. 3, 2002

(65) Prior Publication Data

US 2003/0050347 A1 Mar. 13, 2003

(51) Int. Cl.⁷ .............................. C08J 3/00; C08K 3/20; C08L 75/00; C08F 8/30; C09J 201/00
(52) U.S. Cl. ................. 524/507; 156/330.9; 156/331.4; 156/331.7; 524/591; 524/839; 524/840; 525/123; 525/455
(58) Field of Search .......................... 156/330.9, 331.4, 156/331.7; 524/507, 591, 839, 840; 525/123, 455

(56) References Cited

U.S. PATENT DOCUMENTS

| | | | |
|---|---|---|---|
| 5,539,018 A | 7/1996 | Luhmann et al. | 523/201 |
| 5,594,065 A | 1/1997 | Tien et al. | 524/507 |
| 5,854,332 A * | 12/1998 | Swarup et al. | 524/507 |
| 6,063,861 A | 5/2000 | Irle et al. | 524/591 |
| 6,197,874 B1 * | 3/2001 | Irle et al. | 524/507 |

FOREIGN PATENT DOCUMENTS

| | | | |
|---|---|---|---|
| EP | 0 309 113 | 3/1989 | C08L/75/04 |
| EP | 0 705 855 A2 | 10/1996 | C08G/18/08 |
| EP | 0 933 412 A1 | 4/1999 | C09J/151/00 |

* cited by examiner

Primary Examiner—Patrick D. Niland
(74) Attorney, Agent, or Firm—Thomas F Roland

(57) ABSTRACT

A polymer dispersion comprising an aqueous, continuous phase and dispersed particles of polyurethane, which is based on organic, non-aromatic isocyanates with a functionality of at least 2, said polyurethane having a high degree of crystallinity and whose crystalline phase has a melting point between 25 and 70° C., and a copolymer and/or terpolymer having a $T_g$ (glass transition temperature) between −20 and +50° C. obtainable by emulsion polymerization of ethylenically unsaturated monomeric materials containing only C, H, O and/or N atoms, which monomeric materials comprise from 0.5 to 15 percent on the total of monomeric materials of monomers containing at least one nitrile group, in a weight ratio between 50:50 and 10:90 (polyurethane to emulsion polymer), in which the particles of the dispersion are in the form of multiphase particles comprising said polyurethane and said copolymer and/or terpolymer and which dispersion is obtainable by emulsion polymerization of the monomeric materials in the presence of the polyurethane dispersion, said eventual polymer dispersion having a solids content of 30 to 70%. The invention also comprises the use of these dispersions as an adhesive, especially for heat seal laminating, preferably for 3-D(imensional) Laminating. The dispersion is also useful as a size for glass fibers.

17 Claims, No Drawings

POLYMER DISPERSION COMPRISING PARTICLES OF POLYURETHANE AND A COPOLYMER OR TERPOLYMER PRODUCED BY EMULSION POLYMERIZATION OF OLEFINICALLY UNSATURATED MONOMERS

BACKGROUND OF THE INVENTION

The present invention relates to a polymer dispersion comprising an aqueous, continuous phase and dispersed particles of polyurethane and a copolymer or terpolymer produced by emulsion polymerisation of vinyl- and/or acrylic and/or methacrylic monomeric material(s) in the form of multiphase particles. Products of this type are useful as adhesive materials for various types of substrates.

Products of this type are already known in the art e.g. from:

U.S. Pat. No. 3,705,164 (Honig et al assigned to Bayer) discloses the production of aqueous dispersions by polymerizing olefinically unsaturated monomers by free radical polymerization in the presence of a polyurethane emulsion. Sixteen suitable classes of unsaturated monomers are described including vinyl esters, alkyl esters of $\alpha,\beta$-unsaturated carboxylic acids as e.g. acrylates and methacrylates and nitrites of $\alpha,\beta$-unsaturated carboxylic acids as e.g. acrylonitrile and methacrylonitrile. No preference for any specific monomers is stated. Many of the unsaturated monomeric materials specifically polymerized comprise halogen or sulphur atoms, and/or a high amount of acrylonitrile as it is the intention to use the eventual compositions with pigments as coating compositions. These compositions with a low glass transition temperatures ($T_g$) of say below $-30°$ C. Such compositions with a ($T_g$) below $-30°$ C. are unsuitable for structural adhesives as they would be too soft and give too much blocking.

U.S. Pat. No. 4,198,330 (Samuel Kaizerman et al assigned to America Cyanamid) also discloses products obtained by polymerising unsaturated monomers in the presence of a polyurethane latex. Usually high amounts of acrylonitrile (40%) were employed. The unsaturated monomers employed are all monomers which would yield homopolymers with a $T_g$ higher than $60°$ C., most of those listed have a $T_g$ higher than $80°$ C. The examples using acrylonitrile use a high level thereof and the polymers produced have $T_g$ of approximately $100°$ C. A wide variety of organic diisocyanates, including aromatic diisocyanates are listed and the one illustrated in the example is toluene diisocyanate. The objective is to provide films and coatings of improved strength and less surface tack than unmodified polyurethane films and there is no disclosure of their use as adhesive. In fact for use as an adhesive, a certain level of surface tack would be required.

U.S. Pat. No. 5,594,065 (Chao-Fong Tien assigned to Air Products) disclosing certain very low molecular weight polyurethane/hydroxy acrylate hybrid polymers having a M.W. of e.g. 4000, which requires special steps to be taken during the polymerization as e.g. that a chain terminator like dialkanolamide is used for limiting the molecular weight (M.W.) of the polyurethane, sometimes in combination with a chain transfer agent like a thiol for limiting the molecular weight of the acrylic component. The diisocyanates disclosed include also aromatic ones and the two component polyurethane/hydroxy acrylate hybrid polymers obtained are stated to be useful as coating compositions having a good gloss.

U.S. Pat. No. 5,539,018 (Erhard Lühmann et al assigned to Wolff Walsrode) discloses polymer dispersions containing a water-soluble urethane modified allyl ether polyester and polymerised unsaturated monomers as a multiphase product. Although acrylonitrile and methacrylonitrile have been mentioned as a possible ingredient in the lacquers disclosed there is no disclosure that relatively small amounts thereof have a beneficial effect in adhesive compositions.

EP-B-0 309 113 (ICI Americas) discloses that polymer dispersions containing a polyurethane based on 2,4'-diphenylmethane diisocyanate (an aromatic diisocyanate) and a vinyl polymer have superior properties as to hardness and resistance towards water which are important properties in the case of a coating on steel. Acrylonitrile has been mentioned but there is no disclosure it has any beneficial effect in the case of adhesives. The other diisocyanate specifically claimed i.e. toluene diisocyanate is an aromatic diisocyanate.

U.S. Pat. No. 6,063,861 (Christoph Irle assigned to Bayer AG) discloses aqueous polyurethane-polyacrylate dispersions comprising: A) 10 to 95 wt. % based on the total resin solids of a polyurethane dispersion; B) 5 to 90 wt. % based on the total resin solids of a polymer prepared in the presence of component A) from a mixture of vinyl monomers containing 0.5 to 20 wt % based on the total resin solids of the hybrid dispersion of a vinyl monomer containing acetoacetoxy groups and C) an at least difunctional primary or secondary amine having a number average molecular weight of less than 1.000, which is present in an equivalent ratio of amino groups to acetoacetoxy groups of 0.5:1 to 1.1 to 1 in which the wt. % of A) and B) add up to 100. These compositions comprise a diamine as crosslinker and serve as a 1-component coating composition or binder.

EP-A-0 933 412 (Nat. Starch Chem. Invest) discloses water-resistant adhesives comprising an aqueous emulsion polymer which comprises reacting: A) from 80 to 99 wt. % based on the total of monomers of vinyl acetate; B) from 1 to 10 wt. % based on the total of monomers of an N-methylol containing containing copolymerizable monomer wherein the polymerization is conducted in the presence of C) at least 2 wt. % based on the total weight of the aqueous emulsion of polyvinyl alcohol wherein at least 85% of the polyvinyl alcohol is hydrolyzed and D) from 0.1 to 8.0 per hundred parts of monomer in the emulsion of a water-dispersible nonionic polyurethane obtained by reacting an organic polyisocyanate with certain water-soluble polyalkylene glycols and polyhydric branched alcohols. These adhesives comprise water-soluble polyurethanes, not water dispersed particles, of polyurethanes, and hydrolyzed polyvinyl alcohol.

EP-A-0 705 855 (Air Prod & Chem.) discloses a water-based polymeric dispersion comprising a first aqueous dispersion containing a polymer having a plurality of activated keto methylene groups and an effective amount aromatic aldimine containing curing agent which comprises a blend of: said first aqueous dispersion containing said polymer having activated keto methylene groups and a second aqueous dispersion containing a polymer having a plurality of araldimine functionality. The second dispersion that is used to crosslink with the acetoacetate functionality is the important feature of these compositions. The water-based polymeric composition is a blend of two components that can be dispersed separately, then mixed, dispersed together, or one can be dispersed in the other. The compositions are useful for coatings and adhesives.

Many of the compositions described above have environmental disadvantages because they contain e.g. halogen atoms, sulphur atoms and/or volatile organic solvents like acetone, methyl ethylketone, N-methylpyrrolidone, toluene etc. (cf. EP 0 309 113 p. 5 lines 16–23) and the use of such solvents should therefore rather to be avoided.

SUMMARY OF THE INVENTION

The present invention relates to products using virtually only water as a solvent such as aqueous dispersions are therefore preferred. Moreover it is also an environmental advantage to limit the use of isocyanates and polyurethanes for the same good reason and products containing larger quantities of non-polyurethane polymeric compounds without impairing the application properties therefore are advantageous, also pricewise.

Polymer dispersions suitable as adhesives of this type need to have a good balance of adhesive properties, namely be heat activatable, have a good initial tack, have good adhesion to both substrates with high cohesive strength of the adhesive film, (stringing), be non-blocking at temperatures below the desired sealing temperature, have high resistance to creep at elevated temperatures, and especially for technical scale applications good handling properties such a good pump stability a good pressure stability and good spraying properties. Currently such a balance can be approached to a reasonable extent with the use of a polyurethane dispersion usually in combination with a polyisocyanate hardener. The present invention therefore aims to provide products having preferably a better combination in which at least one of the properties cited above has been improved, but which contain no more than 50% of a polyurethane and at least 50% of a polymer prepared by emulsion polymerization of certain monomeric compounds said product being applied in the form of a dispersion of multiphase particles.

DETAILED DESCRIPTION OF THE INVENTION

In a first embodiment the present invention therefore provides a polymer dispersion suitable for adhesives comprising an aqueous, continuous phase and dispersed particles of polyurethane, which is based on an organic, non-aromatic isocyanate with an average functionality of at least 2, said polyurethane having a high degree of crystallinity and whose crystalline phase has a melting point between 25 and 70° C., and a copolymer and/or terpolymer having a Tg (glass transition temperature) between −20 and +50° C., obtainable by emulsion polymerization of ethylenically unsaturated monomeric materials containing only C, H, O and/or N atoms, which monomeric materials comprise from 0.5 to 15 percent on the total of monomeric materials of monomer(s) containing at least one nitrile group, in a weight ratio between 50:50 and 10:90 (polyurethane to emulsion polymer), in which the particles of the dispersion are in the form of multiphase particles comprising said polyurethane and said copolymer and/or terpolymer and which dispersion is obtainable by emulsion polymerisation of the monomeric materials in the presence of the polyurethane dispersion, said eventual polymer dispersion having a solids content of 30 to 70%.

As stated above the polyurethane being used should have a high degree of crystallinity and its crystalline phase should have a melting point between 25 and 70° C. The high degree of crystallinity can e.g. be observed by DSC.

The melting point of a polyurethane dispersion particles can be suitably determined by Differential Scanning Calorimetry (DSC). We used a TA Instruments 2920 Modulated Differential Scanning Calorimeter. Samples were dried at 120° C. for 1 hour, then the modulated DSC was run with a heating ramp of 3° C./minute from −60 to 100° C., with a modulation of ±1° C./60 seconds. The value quoted for the melting point is the peak position of the melting endotherm in the reversing heat flow curve. A more detailed description of DSC is "Thermal Characterization of Polymeric Materials, Second Edition, Volume 1", edited by Edith A. Turi, Academic Press, 1997. DSC. Instruments are discussed in pages 77–87 and temperature-modulated DSC is discussed in pages 280–292.

Suitable polyurethane emulsions having properties as specified above are commercially available e.g. as Dispercoll U 53, ex Bayer A.G., Leverkusen, an anionically stabilized polyester polyurethane dispersion, at approximately 40% non-volatiles content, based on a polyester of 1,4,-butanediol, adipic acid and dimethylolpropionic acid, and reacted with a mixture of hexamethylene diisocyanate and isophoron diisocyanate, exhibiting a melting point of 47.1° C., by DSC and Luphen DDS 3507, ex BASF, Ludwigshafen, an anionically stabilized polyester polyurethane dispersion, at approximately 45% non-volatiles content, based on a polyester of 1,4-butanediol and adipic acid, and reacted with hexamethlene diisocyanate, exhibiting a melting point of 46.2° C. as determined by DSC and Dispercoll KA 8756 (ex Bayer); an anionically stabilized polyester polyurethane dispersion, at approximately 50% non-volatiles content, based on a polyester of 1,4,-butanediol, adipic acid and dimethylolpropionic acid (DPPA), and reacted with a mixture of hexamethylene diisocyanate and isophorone diisocyanate, exhibiting a melting point of 51.6° C. Preferably, a commercially available polyurethane dispersion that is essentially solvent-free is employed. As an alternative a suitable polyurethane emulsion was prepared by reaction of a polyester polyol or a polyether polyol with an excess of a suitable organic isocyanate with an average functionality of at least 2 under anhydrous conditions at a temperature between 50 and 100° C. The presence of some solvent such as e.g. N-methylpyrrollidone or methylethylketone was beneficial to prevent the reaction product becoming too viscous. A low boiling solvent was preferred as it would be easier to remove later. Subsequently the prepolymer obtained was neutralised with an amine, reacted with a suitable chain extender (such as a diamine or hydrazin etc.) and dispersed into water by stirring. The chemistry and reactants involved are described in more detail in "Waterborne & Solvent Based Surface Coating Resins and their Applications", Volume III, "Polyurethanes", Edited by Paul Thomas, John Wiley & Sons, 1998, pages 158–160 and also in European Patent Specification 0 309 113, pages 2 and 3.

Organic isocyanates with an average functionality of at least 2 can be used but diisocyanates are preferred, especially 1,1'-methylene-bis(4,4'-isocyanato)-cyclohexane, 1,6-hexanediisocyanate and isophoronediisocyanate, but also tetramethylenediisocyanate and e.g. trimethylhexamethylenediisocyanate and mixtures thereof can also be used. Isocyanates with a functionality above 2 can be obtained by using biurets or isocyanurates of HDI or IPDI.

The copolymer or terpolymer having a Tg (glass transition temperature) between −20 and +50° C., obtainable by emulsion polymerization of ethylenically unsaturated monomeric materials containing only C, H, O and/or N atoms, which monomeric materials comprise from 0.5 to 15 percent on the total of monomeric materials of monomer(s) containing at least one nitrile group can be prepared by polymerization of a suitable mixture of monomeric materials by methods known in the art. This reaction is described in more detail in "Emulsion Polymerization and Emulsion Polymers" edited by Peter A. Lovell and Mohamed S. El Aasser, John Wiley and Sons, 1997 as well as in "Methoden der Organischen Chemie", Houben-Weyl, Volume 14/1, 4th Edition, pages 133–560. The suitable mixture of ethylenically unsaturated monomers comprises vinylic esters of of aliphatic carboxylic acids containing 1–20 carbon atoms such as e.g. vinyl acetate, vinyl propionate or vinyl versatate, ethylene, C1–C18 alkyl esters of acrylic acid or methacrylic acid, such as e.g. methyl acrylate, ethyl acrylate, n-butyl acrylate, 2-ethylhexyl acrylate, methyl methacrylate, or n-butyl methacrylate, dialkyl esters and half esters of maleic and fumaric acid containing 1–8 carbon atoms in each alkyl group, such as e.g. dibutyl maleate, vinyl aromatic compounds such as styrene, unsaturated nitriles such as acrylonitrile or methacrylonitrile etc.

Optionally other monomers can also be included in lower amounts to impart other properties. These can include unsaturated carboxylic acids, such as e.g. acrylic acid, methacrylic acid, crotonic acid, vinylacetic acid or carboxyethyl acrylate, or dicarboxylic acids such as maleic acid, fumaric acid, itaconic acid, or citraconic acid, hydroxyalkyl acrylates or methacrylates with 1–4 carbon atoms in the alkyl group such as e.g. hydroxyethyl acrylate, hydroxypropyl acrylate or hydroxyethyl methacrylate, unsaturated amides such as acrylamide or methacrylamide.

Polyunsaturated monomers may also be included, such as e.g. vinyl crotonate, allyl acrylate or methacrylate, diallyl maleate or fumarate, divinyl adipate, ethylene glycol dimethacrylate, butane diol dimethacrylate, methylene bisacrylamide and isocyanurate or divinyl benzene. Post-polymerisation cross-linking monomers can also be present, such as N-methylol acrylamide, N-methylol methacrylamide, N-methylol allyl carbamate, isobutoxymethyl acrylamide and N-butoxymethyl acrylamide, preferred are N-methylol acrylamide or a blend of N-methylol acrylamide and acrylamide, available from Cytec as NMA Special, and silanes such as e.g. vinyl tris(2-methoxyethoxy)silane or vinyl triethoxysilane.

The compostion of the mixture of monomeric materials has to chosen in such a way that the Tg (glass transition temperature) of the emulsion polymer lies between –20 and +50° C. The $T_g$ can be determined in two ways, either by measurement with DSC, or by calculation. The calculation uses the Fox equation, which allows an approximate $T_g$ to be calculated for a copolymer or terpolymer from the $T_g$'s of the homopolymers of the monomers used. This is described in "Emulsion Polymerization and Emulsion Polymers", edited by Peter A. Lovell and Mohamed S. El-Aasser, John Wiley and Sons, 1997, i.a. p. 627 and is:

$$1/T_g = w_1/T_{g1} + w_2/T_{g2} + \ldots$$

where $w_1$ and $w_2$ are the weight fractions of the component monomers 1 and 2 and $T_{g1}$ and $T_{g2}$ are the corresponding homopolymer $T_g$'s. The dots indicate that the equation continues similarly for monomer 3, 4 etc if present. $T_g$'s of many homopolymers can be found in "Polymer Handbook, 3rd Edition", edited by J. Brandrup and E. H. Immergut, John Wiley & Sons 1989 in Chapter VI, pages 209 to 278. It will be clear that the $T_g$ requirement mentioned above puts restrictions on the choice and relative quantities of the various monomers. In order to obtain a dispersion of multiphase particles comprising polyurethane and emulsion polymer the emulsion polymer can be prepared by polymerization of suitable monomeric materials in a dispersion of polyurethane particles.

Typically an emulsion polymerisation is carried out by polymerising a mixture of one or more ethylenically unsaturated monomers in an aqueous continuous phase under the influence of a free radical initiator. Usually the aqueous continuous phase contains one or more emulsifiers or protective colloids, which emulsify the monomer droplets, and provide sites for particle nucleation, (i.e. monomer swollen micelles), as well as providing colloidal stability to the growing particles. However, a polymerisation in which a preformed polymer latex is already present is termed a seeded polymerisation, and the seed particles can become the locus of polymerisation. In the case of a seeded emulsion polymerisation, one or more emulsifying agents may optionally be added, but may not be required. Certain polyurethane dispersions may provide sufficient stability to the growing multiphase particle to obviate the need for additional emulsifying agents.

A suitable polyurethane emulsion as defined above was subsequently used as the reaction medium for the emulsion polymerization, optionally after adding further ingredients of certain ethylenically unsaturated compounds under the influence of free radicals. Sometimes the polyurethane emulsion is first diluted with water and often an (additional) emulsifying agent is added.

Certain surfactants are suitable emulsifying agents and they are described at length in Schwartz, Perry and Birch, "Surface active agents and Detergents", Vol. II, Interscience Publishers Inc. 1958 and in Mark, Crawford & Bikales: Encyclopedia of Polymer Science and Technology, Interscience Publishers, Vol. 5, pages 816–818. We prefer the use of at least one nonionic emulsifier and/or at least one anionic emulsifying agent each in an amount of 0.25 to 10% by weight of the monomers used. In these polymerisations preferably a suitable free radical generator system is used. The choice of free radical generating chemical compound depends on the desired polymerization rate and final polymer properties. Some representative examples of free radical initiators which are commonly used include the various ammonium and alkali metal salts of persulphuric or peracetic acid, such as e.g. ammonium persulphate, sodium persulphate, potassium persulphate, sodium peracetate, peroxides such as e.g. hydrogen peroxide, benzoyl peroxide, tertiarybutyl hydroperoxide, tertiaryamyl hydroperoxide, or cumene hydroperoxide, percarbonates such as e.g. bis(4-tertiarybutylcyclohexyl)peroxydicarbonate, and azo compounds such as e.g. azobisisobutyronitrile or 2,2'-azobis(2-amidinopropane) dihydrochloride. These can be used alone, undergoing homolytic cleavage upon heating to yield free radicals, or in conjunction with a reducing agent in a redox couple. Suitable reducing agents include oxidisable sulphur compounds such as alkali metal sulphites, hydrogen sulphites, metabisulphites, dithionites, formaldehyde sulphoxylates, thiosulphates or pyrosulphites, particularly the sodium salts, ascorbic acid, erythrobic acid and tartatic acid. When a redox couple is used, a compound of a metal which can exist in more than one oxidation state is often included as a co-catalyst or activator. Various transition metal salts can be used, such as e.g. salts of iron, copper or cobalt, but the use of an iron salt, (e g. ferric chloride or ferrous ammonium sulphate), is preferred.

The polymerisation can be carried out using either a batch process, a continuous monomer addition or an incremental monomer addition. The entire amount of any used emulsifiers can be present in the polymerisation vessel before introduction of the monomers, or alternatively part or all of them can be added continuously or incrementally, either as a separate feed or emulsified with the monomers. Suitable emulsifiers include anionic or nonionic surface active compounds or mixtures thereof. Suitable anionic emulsifiers are, for example, alkyl sulphonates, alkylaryl sulphonates, alkyl sulphates, sulphates of hydroxylalkanols, alkyl and alkylaryl disulphonates, sulphonated fatty acids, sulphates and phosphates of polyethyoxylated alkanols and alkylphenols, as well as esters of sulphosuccinic acid. Examples of suitable non-ionic emulsifiers are the addition products of 5 to 100 moles of ethylene oxide adducted to straight-chain and branch-chain alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combimations of emulsifying agents are used, it is advantageous to use a relatively hydrophobic emulsifying agent in combination with a relatively hydrophillic agent, or to use an anionic emulsifying agent in combination with a nonionic agent. The amount of emulsifying agent is generally from about 0.25 to 10%, preferable from about 0.5 to 6% of the monomers used in the polymerisation.

The free radical emulsion polymerization will typically be conducted at a temperature which is within the range of about 30° C. to about 100° C. It is generally preferred for the polymerization to be carried out at a temperature which is with the range of 50° C. to about 90° C. The pressure at which the polymerisation is carried out depends on the nature of the monomers employed. When highly volatile monomer is employed such as e.g. ethylene, superatmospheric pressures, up to e.g. 8000 kPa (80 bar), are necessary, otherwise lower pressures or even atmospheric pressures can be employed. The polymerisation is carried out at a pH of from about 2 to about 8, preferably at a pH of from about 3 to about 6. In order to maintain the pH range, it may be useful to work in the presence of customary buffer systems, for example, in the presence of alkali metal carbonates, alkali metal acetates, and alkali metal phosphates. Other ingredients known in the art to be useful for various purposes in emulsion polymerization, such as acids, salts, chain transfer agents, and chelating agents, can be employed.

In a preferred embodiment the invention provides a polymer dispersion, in which the copolymer and/or terpolymer produced by emulsion polymerization of ethylenically unsaturated monomeric materials comprising vinyl- and/or acrylic and/or methacrylic monomers and at least one nitrile optionally comprises up to 10%, preferably 0.5 to 7% on the total amount of monomeric materials of at least one monomeric material containing an aceto acetoxy group and/or a hydroxyl group, with the hydroxyl group preferably as an N-methylol group. Suitable optional compounds are e.g. acetoacetoxyethylmethacrylate, N-methylolacrylamide and N-methylolmethacrylamide.

In another preferred embodiment of the invention the copolymer and/or terpolymer is produced by emulsion polymerisation of ethylenically unsaturated monomeric materials comprising vinyl- and/or acrylic and/or methacrylic monomers the monomeric material containing at least one nitrile group being acrylonitrile and/or methacrylonitrile in an amount of 3 to 12% by weight on the total amount of monomeric materials.

According to another preferred embodiment the invention provides a polymer dispersion in which the copolymer and/or terpolymer produced by emulsion polymerization of ethylenically unsaturated monomeric materials comprises: 75 to 98.9% by weight of, preferably 81 to 96.5% by weight of, monomers which are C1 to C18 alkyl esters of acrylic and/or methacrylic acid, 1 to 15% by weight, preferably 3 to 12% by weight of monomers containing at least one nitrile group, preferably acrylonitrile and/or methacrylonitrile, 0.1 to 10% by weight, preferably 0.5 to 7% by weight, of monomers comprising an hydroxyl group and/or an acetoacetoxy group, preferably N-methylolacrylamide and/or methacrylamide and/or acetoacetoxyethyl(meth)acrylate.

According to another preferred embodiment the invention provides a dispersion comprising a polyurethane which is obtainable by the condensation reaction between a polyol and an excess of an aliphatic a cycloaliphatic di- and/or polyisocyanate followed by chain extension with a diamine and/or polyamine.

According to another preferred embodiment the invention provides a polymer dispersion in which said organic, non-aromatic isocyanate with a functionality of at least 2 comprises 1,1'-methylenebis(4-4'isocyanato)cyclohexane, (H12MDI), and/or 1,6-hexane diisocyanate, (HDI) and/or isophorone diisocyanate, (IPDI) and/or a mixture thereof.

According to another preferred embodiment of the invention the polyurethane has been prepared by reaction of a polyol which is a polyester based polyol or a polyether based polyol with an organic non-aromatic isocyanate (mixture) with an average functionality of at least 2. The polyol can can be prepared or bought as a commercial product. Sometimes it is desirable to introduce carboxyl groups to provide anionic sites by reaction of the initial polyester with dimethylol propionic acid. Polyether based polyols are frequently based on ethylene oxide adducts of diols or sometimes monohydric alcohols. Sometimes mixtures of ethylene oxide and propylene oxide are reacted with a mono- or dihydric alcohol.

According to another preferred embodiment of the invention the polyurethane component has a melting point in the range of 30 to 60° C. as determined by DSC as described above.

According to another preferred embodiment of the invention the pH of the aqueous phase of the eventual polymer emulsion is between 4 and 9, preferably between 6 and 8. This pH is often maintained by carrying out the emulsion polymerization in a buffered medium and maintaining or adjusting the pH value after the emulsion polymerization.

According to another preferred embodiment of the invention the emulsion polymerization of the mixture of ethylenically unsaturated monomeric compounds is carried out in an aqueous phase which contains as an emulsifying agent a nonionic and/or an anionic surfactant. Suitable nonionics are ethylene oxide adducts such as a fatty alcohol ethoxylate and a nonylphenol ethoxylate and suitable anionics are alkylarylsulphonates such as sodium dodecylbenzenesulphonate. The combination of such a nonionic and such an anionic is preferred.

In another preferred embodiment the invention provides a polymer dispersion as described above, in which the solids content is of 30 to 70%, the Brookfield viscosity determined with spindle 3 at speed 20 rpm is less than 1.0 Pa.s at a temperature of 23° C., and the average particle size is less than 0.5 $\mu$m (micron) as determined by laser light scattering using a Malvern Mastersizer.

According to another preferred embodiment the invention provides the use of a polymer dispersion as described above optionally in the presence of 0.1 to 10% by weight of an isocyanate with an average functionality of at least 2, or such an encapsulated isocyanate or an oxazoline as a heat seal laminating adhesive, preferably for 3-D (3 dimensional) laminating. The isocyanate used is preferably an non-aromatic diisocyanate and more preferably it is or is based on at least one of the diisocyanates listed above.

According to a preferred embodiment the invention provides the use of a polymer dispersion as described above on a substrate comprising wood, plastic, textile or a wood product to which a foil or foam is laminated, preferably a PVC foil on MDF (Medium Density Fibre) board.

According to a preferred embodiment of the invention an article is provided which wholly or partially comprises the material of the multiphase particles comprising polyurethane and emulsion polymer.

According to another preferred embodiment the invention provides the use of a polymer dispersion comprising polyurethane and emulsion polymeras a size for glass fibre.

DESCRIPTION OF PREFERRED EMBODIMENTS

The invention is illustrated by the following non-limiting examples. All parts, percentages and ratios herein are on a weight basis unless otherwise indicated.

EXAMPLE 1

An initial charge consisting of 629 g of Dispercoll U53, (a polyester polyurethane dispersion from Bayer AG, exhibiting a melting point, by modulated DSC, of 47.1° C.), 1.9 g of Arylan SY15, (a 15% aqueous solution of the sodium salt of narrow cut, linear dodecylbenzene sulphonate, from Akcros Chemicals), 2.0 g of acrylonitrile, 7.0 g of methyl methacrylate, 20.0 g of butyl acrylate and 390 g of deionised water was added to a 2-litre glass reaction vessel equipped with a stirrer, condenser and inlet ports through which additions could be made. The reactor was heated to 65° C. and purged with a flow of nitrogen gas.

An aqueous solution was prepared consisting of 5.4 g of Ethylan HA, (a nonylphenol ethoxylate with an average of degree of ethoxylation of 35, from Akcros Chemicals), 61.3 g of Arylan SY15, 34.2 g of a 48% aqueous solution of N-methylol acrylamide, 0.005 g of a non-silicone based defoamer and 112.5 g of deionised water. A monomer mixture consisting of 25.5 g of acrylonitrile, 280.0 g of methyl methacrylate and 212.5 g of butyl acrylate was then added to the aqueous solution, while stirring with a high speed mixer, to form a pre-emulsion. When the temperature in the reaction vessel reached 65° C., a solution of 0.9 g of ammonium persulphate dissolved in 10.0 g of deionised water was added. When the temperature in the reaction vessel had risen to 71° C., continuous additions were commenced of the pre-emulsion and a solution of 0.9 g of ammonium persulphate in 52.0 g of deionised water, to last 4.5 hours, and the temperature was controlled between 74 and 76° C.

After the continuous additions were complete, the temperature was raised to 80° C. for 1 hour. Then the reaction vessel was cooled to 60° C. and a solution of 1.9 g of t-butylhydroperoxide in 14.0 g of deionised water was added, then a solution of 1.7 g of sodium formaldehyde sulphoxylate in 14.0 g of deionised water was added over 30 minutes.

The reactor was cooled and a solution of 0.7 g of 35.4% ammonia in 11.0 g of deionised water was added, and the resultant dispersion was filtered through 120 mesh. The resultant polymer dispersion had a solids content of 44.1%, a urethane/acrylate ratio of 33/67, and the acrylic component had a composition of MMA/BA/ACN/NMA of 50.9/41.3/4.9.12.9.

EXAMPLES 2 to 9

A series of examples was made using a similar process, with varying monomer compositions and urethane/acrylate ratios as detailed in table 1. For examples 2 to 8 the Dispercoll U53 was changed to Luphen DDS 3507, (a polyester polyurethane from BASF, exhibiting a melting point, by modulated DSC, of 46.2° C.), and for example 9 to Dispercoll KA 8756, (a polyester polyurethane dispersion from Bayer AG, exhibiting a melting point, by modulated DSC, of 51.6° C.). Also, in examples 3 to 9, the Ethylan HA was replaced by Lutensol AT 25, (a C16–C18 fatty alcohol ethoxylate with 25 moles of ethylene oxide, from BASF).

COMPARATIVE EXAMPLE 1

An emulsion polymerisation was carried out in the absence of a polyurethane dispersion to produce a pure acrylic polymer dispersion. This was then blended with Luphen DDS 3507 polyurethane dispersion to give a physical blend of acrylic polymer and polyurethane with the same overall composition as example 3.

TABLE 1

Examples 2–9 and Comparative Example 1

| Example | 2 | 3 | 4 | 5 | 6 | 7 | 8 | 9 | Comparative 1 |
|---|---|---|---|---|---|---|---|---|---|
| PUD | DDS 3507 | DDS 3507 | DDS 3507 | DDS 3507 | DDS 3507 | DDS 3507 | DDS 3507 | KA 8756 | DDS 3507 |
| Urethane/acrylate ratio | 33/67 | 30/70 | 20/80 | 10/90 | 9.9/90.1 | 30/70 | 29.4/70.6 | 30/70 | 30/70 blend |
| Acrylate comp. | | | | | | | | | |
| MMA | 50.9 | 50.9 | 50.9 | 50.9 | 43.1 | 39.9 | 49.5 | 50.9 | 50.9 |
| BA | 41.3 | 41.3 | 41.3 | 41.3 | 43.8 | 52.3 | 40.2 | 41.3 | 41.3 |
| ACN | 4.9 | 4.9 | 4.9 | 4.9 | 10.2 | 4.9 | 4.7 | 4.9 | 4.9 |
| NMA | 2.9 | 2.9 | 2.9 | 2.9 | 2.9 | 2.9 | — | 2.9 | 2.9 |
| AAEMA | — | — | — | — | — | — | 5.6 | — | — |
| Non-volatiles (%) | 45.8 | 45.6 | 46.6 | 46.1 | 46.5 | 45.5 | 46.1 | 45.2 | 42.9 |
| PH | 7.6 | 8.4 | 8.1 | 8.6 | 7.8 | 7.8 | 6.0 | 6.6 | 6.9 |

EXAMPLE 10

Testing of Heat Seal Adhesion Properties

The polymer dispersions of examples 1 to 9, comparative example 1, and two commercially available polyurethane disperions were tested for heat seal adhesion properties as follows.

In a 200 ml plastic container, 100 g of polymer dispersion was adjusted to pH 7 to 8, using a 10% aqueous solution of potassium hydroxide, and stirred until the pH remained constant. Then 5 g of a modified, aliphatic, HDI based polyisocyanate crosslinker, (either Desmodur DA or Desmodur KA 8703, from Bayer AG), was added and the mixture was stirred for 15 minutes at as high a speed as possible without entraining air into the formulation, using a Janke & Kunkel IKA-WERK RW 20 DZM motor, equipped with a 3-bladed propeller stirrer, with a diameter of 3 cm. The formulation was then used as soon as possible to avoid any foaming caused by reaction of the polyisocyanate.

A 75 μm thick film was applied to a piece of MDF, (15×8×0.8 cm), and dried for 1 hour at room temperature. Once the film had dried its blocking characteristics were assessed by hand, and judged on a subjective scale from 1 to 10, with 10=no blocking. A strip of PVC foil, (5 cm wide) was applied to the coated MDF, and pressed on a BIMA B300.7 membrane press for 60 seconds at a pressure of 3 bar and a temperature of 90° C. Immediately after sealing, the PVC foil was peeled back a little bit and an assessment was made of the initial tack and stringing, again on subjective scales from 1 to 10, with 1=no tack or stringing, 5=acceptable tack or stringing, and 10=excellent tack or stringing. After 24 hours, the PVC foil was peeled back a little further and an assessment made of wood failure, on a percentage scale, of how much of the MDF surface was pulled off.

After 7 days drying at room temperature, the creep resistance was tested by a 180° peel test, using a 1 kg weight, in a Gallenkamp PLUS II Oven. A measurement was then made of the amount of delamination, (in mm), after 1 hour at the set temperature.

Results are tabulated in table 2.

TABLE 2

Heat Seal Adhesion Properties

| Example | Polyisocyanate | Blocking | Initial Tack | Stringing | Wood Failure | Creep at 90° C., (mm) |
|---|---|---|---|---|---|---|
| 1 | DA | 10 | 8 | 8 | 100 | 3 |
| 1 | KA 8703 | 10 | 8 | 8 | 100 | 3 |
| 2 | DA | 10 | 8 | 8 | 100 | 2 |
| 2 | KA 8703 | 10 | 5 | 5 | 100 | 0 |
| 3 | KA 8703 | 10 | 8 | 8 | 100 | 1 |
| 3 | DA | 10 | 8 | 8 | 100 | 5 |
| 4 | KA 8703 | 10 | 8 | 5 | 100 | 1 |
| 5 | KA 8703 | 10 | 5 | 5 | 100 | 1 |
| 6 | KA 8703 | 10 | 8 | 8 | 100 | 1 |
| 7 | KA 8703 | 10 | 10 | 10 | 100 | 7 |
| 8 | DA | 10 | 8 | 5 | 100 | 5 |
| 9 | DA | 10 | 8 | 5 | 100 | 10 |
| Dispercoll U53 | DA | 10 | 8 | 10 | 100 | 3 |
| Dispercoll U53 | KA 8703 | 10 | 8 | 10 | 100 | 1 |
| Luphen DDS 3507 | DA | 10 | 8 | 10 | 100 | 0.2 |
| Luphen DDS 3507 | KA 8703 | 10 | 8 | 10 | 100 | 1 |
| Comparative 1 | DA | 10 | 8 | 5 | 100 | 20 |

Comparison of the results for examples 1 to 9 with those for pure polyurethane dispersions, shows that, by using the polymer dispersions of the present invention, it is possible to match the creep resistance obtained by using the polyurethane dispersions, while maintaining a useful balance of blocking, tack and stringing. Moreover handling properties of the polymer dispersions according to the invention were found superior.

Comparison of the results for example 3 and comparative example 1 shows that, in the case where the acrylic polymer is polymerised in the presence of the polyurethane dispersion, the creep resistance at 90° C. is clearly superior than that obtained by blending an acrylic polymer with the polyurethane dispersion. A creep of 20 mm would be unacceptable.

EXAMPLE 11

Polyurethane Synthesis 170 g of a polyester polyol, (Bester 121, a linear 1,6-hexanediol adipate polyester polyol, from Poliolchimica, Parona Lomellina, Italy) and 22 g of DMPA, (dimethylolpropionic acid), were added to a one litre reaction vessel and heated and stirred at 80° C. for 30 min in order to remove any moisture. The mixture was then cooled down to 60° C. and 75 g of H12MDI, (1,1'-methylenebis(4,4'-isocyanato)cyclohexane), was added using a syringe. This mixture was then heated back up to 80° C. and stirred for 2¾ h to form the prepolymer, after which the isocyanate content had fallen from the theoretical value of 8.99% to a level of 2.72%, (measured by dibutylamine titration). During this period, 40 g of NMP, (N-methylpyrollidinone) was added slowly to prevent the prepolymer from becoming too viscous. 18.3 g of TEA, (triethylamine), neutralising agent was then added to the prepolymer when it had cooled down to approx 40–50° C. Once the TEA was completely mixed in, 1.48 g of piperazine hexahydrate as chain extender, a further 2.5 g of TEA and 170 g of water were added quickly, followed by a further 300 g of water added slowly under high shear conditions, and the dispersion formed, after which it was allowed to cool down to room temperature over a period of approx. 2 h and then discharged. The resultant PU dispersion had a solids content of 34.4%, a pH of 7.8, and which had a crystalline phase with a melting point of 42.6° C. as measured by DSC. Further examples were made using a similar process to that for Example 1, with the following compsitions.

TABLE 3

| Examples | 12 | 13 | 14 |
|---|---|---|---|
| PUD | In-house, (above) | DDS 3507 | KA 8756 |
| Urethane/acrylate ratio | 30/70 | 30/70 | 30/70 |
| Acrylate composition | 50.9 | 62.9 | 27.0 |
| MMA | 41.3 | 29.3 | 65.2 |
| BA | 4.9 | 4.9 | 4.9 |
| ACN | 2.9 | 2.9 | 2.9 |
| NMA | — | — | — |
| AAEMA | | | |
| Non-volatiles (%) | 42.5 | 45.6 | 45.3 |
| PH | 7.4 | 6.9 | 8.3 |

What is claimed is:

1. A polymer dispersion comprising:
    a) an aqueous continuous phase; and
    b) dispersed particles of
        1) a polyurethane, wherein said polyurethane is formed from organic, non-aromatic isocyanates having a functionality of at least 2, wherein said polyurethane has a high degree of crystallinity and those crystalline phase has a melting point of between 25° C. and 70° C.; and 2) an emulsion copolymer or terpolymer having a Tg of between −20° C. and +50° C., wherein said polymer is formed from ethylenically unsaturated monomers containing only C, H, O, and/or N atoms, and wherein said polymer is formed from 0.5 to 15 percent by weight of at least one monomer containing at least one nitrile group, based on the total weight of monomers, wherein the ratio of polyurethane to emulsion polymer is between 50:50 and 10:90; wherein the particles of the dispersion are in the form of multiphase particles comprising said polyurethane and said polymer; and wherein said dispersion is formed by emulsion polymerization of the monomers in the presence of a polyurethane dispersion, and wherein said polymer dispersion has a solids level of from 30 to 70 percent by weight, and wherein said emulsion copolymer or terpolymer further comprises from 0.5 to 10 percent by weight of the total monomers of at least one monomer having a functionality selected from the group consisting of aceto acetoxy, hydroxyl, and methylol functionalities, or a mixture thereof.

2. The polymer dispersion of claim 1 wherein said emulsion copolymer or terpolymer is formed from monomers comprising vinyl monomers, acrylic monomers, methacrylic monomers, and mixtures thereof.

3. The polymer dispersion of claim 1 wherein said emulsion copolymer or terpolymer comprises from 3 to 12 percent by weight of acrylonitrile, methacrylonitrile, or a mixture as the monomer or monomers containing at least one nitrile group.

4. The polymer dispersion of claim 1 wherein said copolymer or terpolymer comprises 0.5 to 7 percent by weight of N-methylolacrylamide, methacrylonitrile, or a mixture thereof.

5. The polymer dispersion of claim 1 wherein said emulsion copolymer or terpolymer comprises:

a) 75 to 98.9 percent by weight of at least one $C_{1-18}$ alkyl esters of acrylic acid, methacrylic acid, or a mixture thereof;

b) 1 to 15 percent by weight of at least one monomer containing at least one nitrile group; and c) 0.1 to 10 percent by weight of at least one monomer containing a hydroxyl group, an aceto-acetoxy group, or a mixture thereof.

6. The polymer dispersion of claim 5 wherein said emulsion copolymer or terpolymer comprises:

a) 81 to 96.5 percent by weight of at least one $C_{1-18}$ alkyl esters of acrylic acid, methacrylic acid, or a mixture thereof;

b) 3 to 12 percent by weight of at least one monomer containing at least one nitrile group; and c) 0.5 to 7 percent by weight of at least one monomer containing a hydroxyl group, an aceto-acetoxy group, or a mixture thereof.

7. The polymer dispersion of claim 5, wherein said monomer containing a hydroxyl group, an aceto-acetoxy group consists of N-methylolacrylamide, methacrylmide, acetoacetoxy-ethyl(meth)acrylate, or a mixture thereof.

8. The polymer dispersion of claim 1 wherein said polyurethane is formed by the condensation reaction between a polyol and excess organic, non-aromatic isocyanate having a functionality of at least 2, followed by chain extension with a diamine, polyamine, or mixture thereof.

9. The polymer of claim 8 wherein said organic non-aromatic isocyanate comprises 1,1'-methylenebis(4,4'-isocyanato)cyclohexane, 1,6-hexanediisocyanate, isoporone diisocyanate, or a mixture thereof.

10. The polymer dispersion of claim 8 wherein said polyol is a polyester- or polyether-based polyol.

11. The polymer of claim 1, wherein said polyurethane crystalline phase has a melting point of from 30° C. to 60° C, as determined by Differential Scanning Calorimetry.

12. The polymer dispersion of claim 1 wherein the pH of the aqueous phase is from 4 to 9.

13. The polymer dispersion of claim 12 wherein the pH of the aqueous phase is from 6 to 8.

14. The polymer dispersion of claim 1 wherein said aqueous phase contains an emulsifying agent comprising one or more nonionic surfactants, anionic surfactants, and mixtures thereof.

15. A process for heat seal laminating comprising:

a) applying the polymer dispersion of claim 1 to a substrate;

b) drying said polymer dispersion;

c) contacting said polymer dispersion-coated substrate with a second substrate;

d) heating the two substrates at the point where the dried polymer dispersion touches both substrate, to heat-seal the two substrates.

16. The process of claim 15 wherein said heat seal laminating process comprises a 3-D laminating process.

17. The process of claim 15, wherein said first and second substrate are each independently selected from the group consisting of wood, plastic, textile, foil, and foam.

* * * * *